United States Patent [19]

Hannecart et al.

[11] Patent Number: 5,236,627
[45] Date of Patent: Aug. 17, 1993

[54] COMPOSITIONS OF ELECTRICALLY CONDUCTIVE POLYMERS DERIVED FROM SUBSTITUTED OR UNSUBSTITUTED PYRROLE AND PROCESS FOR OBTAINING THEM

[75] Inventors: Etienne Hannecart, Tervuren; Elise Destryker, Sint-Pieters-Leeuw, both of Belgium

[73] Assignee: Solvay & Cie (Societe Anonyme), Brussels, Belgium

[21] Appl. No.: 564,065

[22] Filed: Aug. 8, 1990

[30] Foreign Application Priority Data

Aug. 14, 1989 [FR] France .................. 89 10951

[51] Int. Cl.$^5$ ............................. H01B 1/06
[52] U.S. Cl. ..................... 252/500; 252/518; 252/519
[58] Field of Search .......... 252/500, 518, 519; 526/258

[56] References Cited

U.S. PATENT DOCUMENTS

| | | | |
|---|---|---|---|
| 4,547,270 | 10/1985 | Naarmann | 252/500 |
| 4,697,000 | 9/1987 | Witucki et al. | 252/500 |
| 4,731,408 | 3/1988 | Jasre | 252/511 |
| 4,781,443 | 11/1988 | Gills | 252/500 |
| 4,818,646 | 4/1989 | Takakubo et al. | 252/518 |
| 4,847,115 | 7/1989 | Warren et al. | 526/258 |
| 4,880,508 | 11/1989 | Addissi | 252/518 |
| 4,892,678 | 1/1990 | Tanake et al. | 252/500 |
| 4,929,389 | 5/1990 | Aldissi | 252/518 |
| 4,959,162 | 9/1990 | Armes et al. | 252/500 |
| 4,985,124 | 1/1991 | Claussen et al. | 204/72 |
| 5,023,133 | 6/1991 | Yodice et al. | 252/500 |

FOREIGN PATENT DOCUMENTS

| | | |
|---|---|---|
| 0129070 | 5/1984 | . |
| 0253594 | 1/1988 | European Pat. Off. . |
| 0267392 | 5/1988 | European Pat. Off. . |
| 0280173 | 8/1988 | European Pat. Off. . |
| 3640205 | 6/1988 | Fed. Rep. of Germany . |
| 87/05914 | 10/1987 | PCT Int'l Appl. . |
| 2184738 | 7/1987 | United Kingdom . |

OTHER PUBLICATIONS

Japanese Journal of Applied Physics/Part 2; Letters, vol. 26, No. 6, Jun. 1987, pp. L1038–L1039.
R. Sugimoto et al., *Preparation of Soluble Polythiophene Derivatives Utilizing Transition Metal Halides As Catalysts and Their Property*, Chemical Abstracts, vol. 106, No. 12, abstract #85145f, p. 6 (1987).
French Patent Office Search Report, Application EP 90 20 2100 (Nov. 15, 1990).
Chemical Abstracts, vol. 104, No. 17, Apr. 28, 1986, Abstract No. 158211 of Ger. Offen. De 3,425,511.
Chemical Abstracts, vol. 101, No. 17, Oct. 22, 1984, Abstract No. 162215 of Ger. Offen. DE 3, 305,401.
Chemical Abstracts, vol. 109, No. 22, Nov. 1988, p. 649, Resume No. 199773b, Columbus, Ohio, U.S.; J. R. Reynolds et al.
Makromolekulare Chemie, vol. 5, No. 3, Mar. 1984, pp. 157-164, Heidelberg DE; W. Wernet et al.: "A new series of conducting polymers with layered structure: Polypyrrole n-alkylsulfates and n-alkylsulfonates", pp. 157 and 158.
Journal of Colloid and Interface Science, vol. 118, No. 2, Apr. 87, pp. 411–416, S. P. Armes et al.
Chemical Patents Index, Basic Abstracts Journal, Section A: Plasdoc, week 8742, abstract #AN-87-296490 (Dec. 16, 1987).
63-178442, Jul. 1988, Japanese Abstract.

Primary Examiner—Mark L. Bell
Assistant Examiner—Paul Marcantoni
Attorney, Agent, or Firm—Willian Brinks Olds Hofer Gilson & Lione

[57] ABSTRACT

The invention relates to a composition of electrically conductive polymers chosen from polypyrrole and/or substituted polypyrrole and ionic groups containing a 2-ethylhexylsulphate group.

The invention also relates to a process for obtaining this composition.

12 Claims, 1 Drawing Sheet

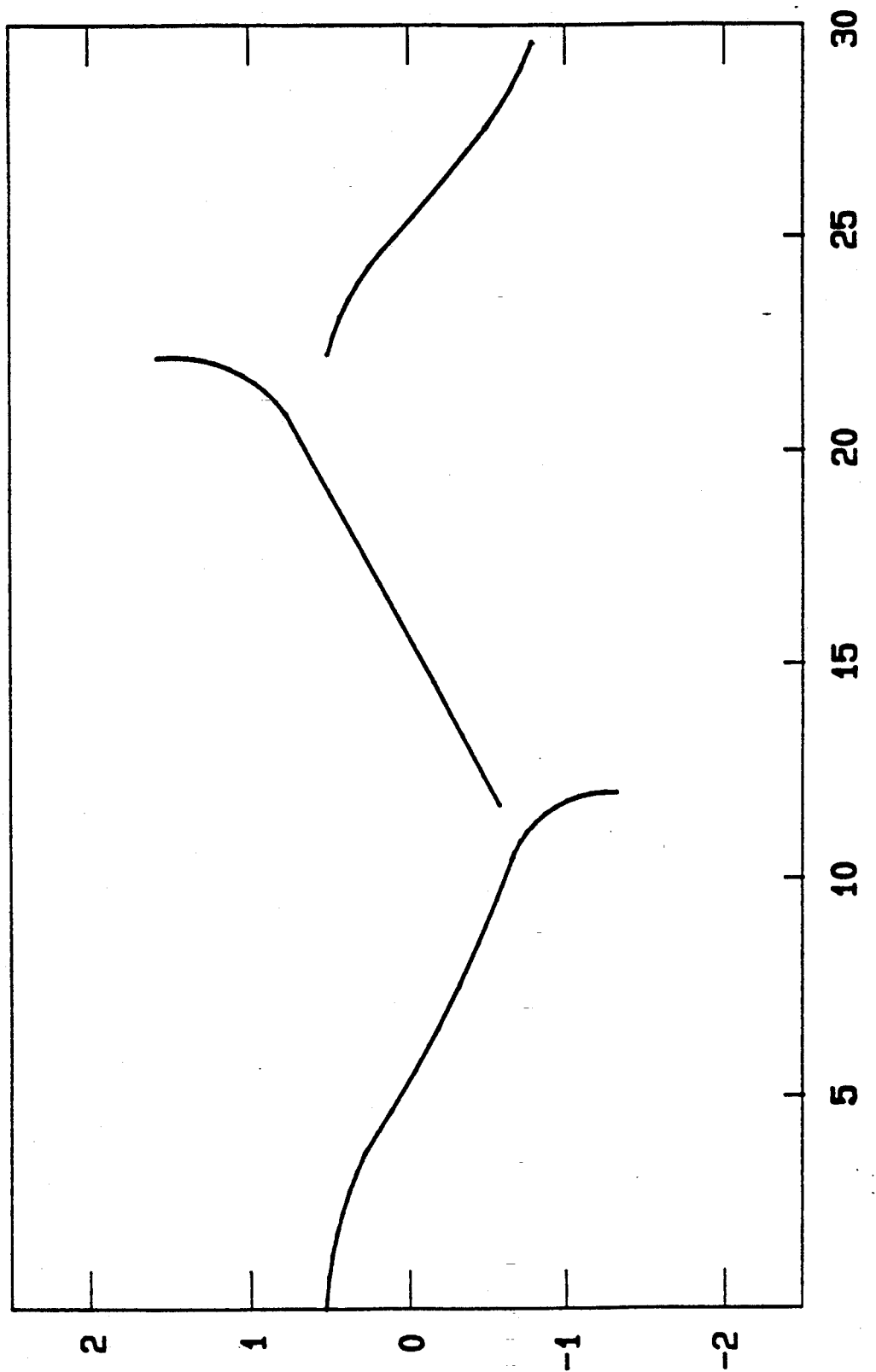

COMPOSITIONS OF ELECTRICALLY CONDUCTIVE POLYMERS DERIVED FROM SUBSTITUTED OR UNSUBSTITUTED PYRROLE AND PROCESS FOR OBTAINING THEM

BACKGROUND OF THE INVENTION

1. Field of the Invention

The present invention relates to compositions of electrically conductive polymers derived from substituted or unsubstituted pyrrole polymers containing ionic groups composed of an alkyl sulphate group. The invention also relates to a process for the preparation of these compositions by chemical polymerization of pyrrole and/or of substituted pyrrole in the presence of such ionic groups.

2. Discussion of Related Art

In U.S. Pat. No. 4,697,000 (Rockwell International Corporation) a process was proposed for preparing electrically conductive polymers in which liquid pyrrole is treated with a solution of an oxidizing agent chosen from $Fe^{3+}$ cations in the presence of a dopant anion such as an organic sulphate anion (dodecylsulphate).

SUMMARY OF THE INVENTION

However, some electrical applications such as the production of electrochemical storage systems of the capacitance or capacitor type with a high energy density and a long cycle time require conductive polymers with special properties exhibiting developed morphologies.

These special properties are especially a high energy per unit mass and unit volume for applications in energy sources feeding portable systems, a long lifetime of the pseudocapacitive type, and a good resistance of the polymer to aging over a wide range of temperatures and storage conditions.

The developed morphology, for its part, is characterized especially by a suitable large pore volume and a suitable pore size distribution.

The present invention is aimed at providing new compositions of electrically conductive polymers based on pyrrole which exhibit the abovementioned special properties.

The invention relates for this purpose to a composition comprising an electrically conductive polymer chosen from polypyrrole and/or substituted polypyrrole and ionic groups which contain at least one alkyl sulphate group, the alkyl being a saturated aliphatic chain, branched or otherwise and containing 8 carbon atoms.

A polypyrrole and/or substituted polypyrrole means all polymers derived from pyrrole and/or from substituted pyrroles, that is to say the homopolymers and the copolymers containing pyrrole or substituted pyrrole units. Among the substituted pyrroles those usually meant are the pyrroles substituted in the 3 or 3 and 4 positions and N-methylpyrrole. The best results have been obtained with unsubstituted pyrrole.

An ionic compound containing an alkyl sulphate group means any organic or inorganic compound capable of yielding such alkyl sulphate groups. In general it originates from an alkyl sulphate salt. Usually it originates from an alkali or alkaline-earth metal salt, a phosphonium salt, an ammonium salt or an amine derivative. It originates preferably from an alkali metal salt. In a particularly preferred manner it originates from a sodium salt.

An alkyl sulphate group, in which the alkyl group is a saturated aliphatic chain, branched or otherwise, containing 8 carbon atoms, preferably means the unbranched octylsulphate group and the 2-ethylhexylsulphate group. The best results have been obtained with the 2-ethylhexylsulphate group.

BRIEF DESCRIPTION OF THE FIGURE

The FIGURE represents a cycle curve of the capacitor of Example 2 between $-1.5$ and $+1.5$ V at 500 $\mu A$ at 25° C. In the FIGURE, the abscissa (the X-axis) shows the time in hours and the ordinate (the Y-axis) shows the voltage in volts.

DETAILED DESCRIPTION OF PREFERRED EMBODIMENTS

The compositions according to the invention usually contain 0.01 to 0.9 parts of ionic compound containing an alkyl sulphate group per part of pyrrole and/or of substituted pyrrole, and preferably 0.05 to 0.5 and particularly preferably 0.05 to 0.4.

The compositions according to the invention may advantageously contain other ionic groups such as those which are organic or inorganic in origin. As an inorganic group they usually contain a chloride, a sulphate or a nitrate and, as an organic group, groups of the trichloroacetate, phenylphosphonate, 2-glycerolphosphate, pentadecylsulphonate, hexddecylsulphonate, polyvinylsulphonate, polystyrenesulphonate, dodecylbenzenesulphonate, tosylate, trifluoromethanesulphonate or dodecylsulphate type. They preferably contain an inorganic group. The best results have been obtained when the composition additionally contains a chloride group.

The pore volume of the compositions according to the invention is usually greater than $1 \text{ cm}^3 \text{ g}^{-1}$ and is preferably between 1.5 and $5 \text{ cm}^3 \text{ g}^{-1}$. The best results have been obtained with a composition according to the invention which has a pore volume greater than $3.5 \text{ cm}^3 \text{ g}^{-1}$.

The present invention also relates to a process for preparing the compositions according to the invention.

To this end the invention relates to a process for preparing a composition comprising an electrically conductive polymer chosen from polypyrrole and/or substituted polypyrrole by chemical polymerization of pyrrole and/or of substituted pyrrole in an aqueous reaction medium comprising an ionic compound containing an alkyl sulphate group, the alkyl being a saturated aliphatic chain, branched or otherwise, containing 8 carbon atoms.

0.03 to 3 moles of the ionic compound containing an alkyl sulphate group are generally used per mole of pyrrole and/or of substituted pyrrole, usually 0.05 to 1.5 moles and preferably 0.10 to 0.60 moles.

A ferric salt is also usually put into the reaction medium. An organic or inorganic ferric salt is generally used. The inorganic ferric salt usually used is a chloride, a sulphate or a nitrate and the organic ferric salt used is compounds of the trichloroacetate, phenylphosphonate, 2-glycerolphosphate, pentadecylsulphonate, hexadecylsulphonate, polyvinylsulphonate, polystyrenesulphonate, dodecylbenzenesulphonate, tosylate, trifluoromethanesulphonate and dodecylsulphate type. An inorganic iron salt is preferably used and ferric chloride is very particularly preferred.

0.3 to 5 moles of ferric salt are generally used per mole of pyrrole and/or of substituted pyrrole. Good results have been obtained with concentrations of between 2 and 3 moles of ferric salt per mole of pyrrole and/or of substituted pyrrole.

The process according to the invention is preferably carried out in an aqueous medium, but the quantity of water needed can vary within wide limits and depends essentially on the other components.

The temperature at which the process is carried out is generally between 0° and 50° C. and preferably between 5° and 40° C. when the operation is carried out at atmospheric pressure.

The pressure at which the process is carried out is not critical in itself. It is generally between 0.1 and 10 bars and is preferably equal to atmospheric pressure.

The process according to the invention can be carried out in any apparatus or any reactor capable of combining the operating conditions described above.

The compositions of the invention can be employed for their electrical conductivity, electromagnetic absorption and thermal conductivity properties, and more particularly for producing electroconductive devices.

The composition comprising an electrically conductive polymer according to the invention can be doped with cations or anions while the system is being charged or discharged; the cations or the anions originate from the electrolyte.

The electrolytes are generally chosen from conductive salts of formula $C^+A^-$ in which $C^+$ is a cation and in which $A^-$ is an anion.

The cation $C^+$ is usually chosen from ammonium, alkaline-earth or alkali metal ions, the $R_4N^+$ and $R_4P^+$ ions (R being an alkyl radical such as, for example, the ethyl and butyl radicals), and preferably from $Li^+$, $Na^+$ or $K^+$ cations, or complex ions such as $(Bu)_4N^+$ or $(Et)_4N^+$, preferably used in the form of $LiClO_4$, $KPF_6$, $(Bu)_4NClO_4$ and $(Et)_4NClO_4$ in solution in a solvent such as acetonitrile, tetrahydrofuran or propylene carbonate.

The anion $A^-$ is chosen from the $ClO_4^-$, $AsF_6^-$, $SbF_6^-$, $SO_4^{2-}$, $C_6H_5SO_3^-$, $BF_4^-$, $PF_6^-$, $CF_3SO_3^-$, $I_3^-$, $Br^-$ and $NO_3^-$. The best results have been obtained with the $ClO_4^-$ ion.

The compositions according to the invention may be advantageously employed in electrochemical storage systems of the capacitance or capacitor type with a high energy density and a long cycle time. The capacitors consist of two electrodes separated by an electrolyte; at least one of the two electrodes consists of the composition comprising an electrically conductive polymer according to the invention. These electrochemical capacitors with a high specific energy may be symmetrical capacitors (the two electrodes are identical) or unsymmetrical ones (the two electrodes are of different kinds).

In the case of an unsymmetrical capacitor the counterelectrode consists either of a different conductive polymer or of an alkali metal or an insertion compound. The counterelectrode can consist of a p-doped polymer such as especially the other electrically conductive polymers based on polypyrroles, substituted or otherwise, on polythiophenes, substituted or otherwise, on polyacetylene, on polyphenylene or on an aniline polymer.

The composition comprising a conductive polymer according to the invention can also be employed in the production of rechargeable batteries, of a generator, or of an electrical cell or accumulator in which the anodes (or the cathodes) consist of electrodes consisting of or coated with films composed of these compositions according to the invention, doped with anions (or cations).

The invention is illustrated by the following examples:

EXAMPLE 1

750 ml of water and 15 ml (0.22 moles) of pyrrole are introduced under a nitrogen atmosphere into a 4000-ml 4-necked round bottom flask.

To the reaction mixture thus obtained are added, with stirring at 20° C. and over 15 minutes, 9.2 g (0.040 moles) of sodium 2-ethylhexylsulphate (a product, called 2-ethylhexanol sodium sulphate, sold by the Tensia company under the trademark Tensatil DEH.120) and 148 g (0.55 moles) of ferric chloride ($FeCl_3.6H_2O$), the whole dissolved in 250 ml of water.

The flask is stirred at 20° C. for 2 hours.

The polymer obtained is filtered off and is then washed 3 times with 500-ml portions of water, 3 times with 500-ml portions of a 50/50 mixture of water and methanol and then 3 times with 500-ml portions of methanol.

The polymer is then dried overnight under vacuum at 20° C. and at 20 mm Hg.

A black powder is obtained in a yield of approximately 77% by weight of polymer, calculated as undoped/monomer.

This powder is pressed for a few minutes at 20° C. under a pressure of 2 tonnes per $cm^2$.

The small tablet obtained has a conductivity of 38 S $cm^{-1}$.

The elemental composition of the conductive polymer obtained is C/H/N/Cl/S/Fe:5.2/6.2/1/0.19/0.14/0.00 in gram-atoms.

Its specific surface is 11 $m^2/g$ and its pore volume is 4.33 $cm^3/g$.

The composition comprising the conductive polymer contains 62% of polypyrrole.

EXAMPLE 2

A symmetrical supercapacitor is produced; the two electrodes are identical and made from the composition as obtained in Example 1.

The composition is dried for 15 hours at 50° C. under vacuum (0.2 mm Hg).

This composition is then pressed for 20 seconds at 20° C. under a pressure of 650 kg per $c^2$.

The tablet thus obtained is then impregnated with the electrolyte consisting of $LiClO_4$ in solution (1M) in propylene carbonate The diameter of the tablet is 14 mm; this tablet forms the electrode and consists of 80 mg of doped polypyrrole.

The electrolytic separator consists of an electrolyte-impregnated polyamide felt; this felt is also used as an electrolyte reserve.

The two electrodes and the electrolytic separator are stacked and mounted in a nickel casing 20 mm in diameter and 2 mm in thickness. A polypropylene seal provides the sealing after crimping. These operations are carried out in an anhydrous atmosphere at room temperature. An element which has the characteristics detailed below is thus obtained.

The series and transfer resistances measured in complex impedance between 65 kHz and 0.1 Hz are equal to 12 Ω and 70 Ω respectively.

A cycle curve of this capacitor between −1.5 V and +1.5 V at 500 μA at 25° C. is shown in FIG. 1. The abscissa in this figure shows the time in hours and the ordinate shows the voltage in volts.

The mean capacity of the element is 12.3 F; this corresponds to an electrode capacity per unit mass of 307 F/g of electrode, that is 128 A h/kg of electrode for an operating voltage difference of 1.5 V.

EXAMPLE 3

750 ml of water and 15 ml (0.22 moles) of pyrrole are introduced under a nitrogen atmosphere into a 4000-ml 4-necked round bottom flask.

To the reaction mixture thus obtained are added, with stirring at 20° C. and over 15 minutes, 11.3 g (0.044 moles) of sodium octylsulphate (product sold by Henkel under the trademark Texapon 890) and 148 g (0.55 moles) of ferric chloride ($FeCl_3.6H_2O$), the whole being dissolved in 250 ml of water.

The flask is stirred at 20° C. for 2 hours.

The polymer thus obtained is filtered off and is then washed 3 times with 500-ml portions of water, 3 times with 500-ml portions of a 50/50 mixture of water and methanol and then 3 times with 500-ml portions of methanol.

The polymer is then dried overnight under vacuum at 20° C. and at 20 mm Hg.

A black powder is obtained in a yield of approximately 75% by weight of polymer calculated as undoped/monomer.

This powder is pressed for a few minutes at 20° C. under a pressure of 2 tonnes per $cm^2$.

The small tablet obtained has a conductivity of 40 S $cm^{-1}$.

The elemental composition of the conductive polymer obtained is C/H/N/Cl/S/Fe:5.3/6.8/1/0.14/0.18/0.00 in gram-atoms.

Its specific surface is 5 $m^2/g$, its pore volume is 2.04 $cm^3/g$.

The composition comprising the conductive polymer contains 57% of polypyrrole.

EXAMPLE 4

A symmetrical supercapacitor is produced in which the two electrodes are identical and are made from the composition as obtained in Example 3.

The composition as obtained in Example 3 is dried for 15 hours at 50° C. under vacuum (0.2 mm Hg).

This composition is then pressed for 20 seconds at 20° C. under a pressure of 650 kg per $cm^2$.

The tablet thus obtained is then impregnated with the electrolyte consisting of $LiClO_4$ in solution (1M) in propylenecarbonate. The tablet is 14 mm in diameter; this tablet forms the electrode and consists of 75 mg of doped polypyrrole.

The electrolytic separator consists of an electrolyte-impregnated polyamide felt; this felt is also used as an electrolyte reserve.

The two electrodes and the electrolytic separator are stacked and mounted in a nickel casing 20 mm in diameter and 2 mm in thickness. A polypropylene seal provides the sealing after crimping. These operations are carried out in an anhydrous atmosphere at room temperature. An element which has the characteristics detailed below is thus obtained.

The series and transfer resistances measured in complex impedance between 65 kHz and 0.1 Hz are equal to 18 Ω and 60 Ω respectively. The mean capacity of the element is 9.36 F; this corresponds to an electrode capacity per unit mass of 234 F/g of electrode.

EXAMPLE 5

750 ml of water and 15 ml (0.22 moles) of pyrrole are introduced under a nitrogen atmosphere into a 4000-ml 4-necked round bottom flask.

To the reaction mixture thus obtained are added, with stirring at 20° C. and over 15 minutes, 5 g (0.022 moles) of sodium 2-ethylhexylsulphate (product sold by the Tensia company under the trademark Tensatil DEH.120), 19 g (0.055 moles) of sodium dodecylbenzenesulphonate, and 148 g (0.55 moles) of ferric chloride ($FeCl_3.6H_2O$), the whole being dissolved in 250 ml of The flask is stirred at 20° C. for 2 hours.

The polymer composition thus obtained is filtered off and is then washed 3 times with 500-ml portions of water, 3 times with 500-ml portions of a 50/50 mixture of water and methanol and then 3 times with 500-ml portions of methanol.

This composition is then dried overnight under vacuum at 20° C. and at 20 mm Hg.

A black powder is obtained in a yield of approximately 89% by weight of polymer calculated as undoped/monomer.

The final composition comprising the conductive polymer contains 44% of polypyrrole.

EXAMPLE 6

A rechargeable generator is produced with the composition as obtained in Example 5. The negative electrode is composed of pure lithium; it is a lithium disc 14 mm in diameter and 200 μm in thickness.

The positive electrode is made from the composition as obtained above.

To do this, the composition is dried for 15 hours at 50° C. under vacuum (0.2 mm Hg) and is then pressed for seconds at 20° C. under a pressure of 650 kg per $cm^2$.

The tablet thus obtained is then impregnated with the electrolyte consisting of $LiClO_4$ in solution (1M) in propylenecarbonate. The tablet is 14 mm in diameter; this tablet forms the positive electrode and contains 73 mg of doped polypyrrole.

The electrolytic separator consists of an electrolyte-impregnated polyamide felt; this felt is also used as an electrolyte store.

The two electrodes and the electrolytic separator are pressed together and mounted in a nickel casing 20 mm in diameter and 2 mm in thickness. A polypropylene seal provides the sealing after crimping. These operations are carried out in a glovebox under argon atmosphere at room temperature. An element which has the characteristics detailed below is thus obtained.

After fitting the measured open circuit voltage is 3.20 V.

The series and transfer resistances measured in complex impedance between 65 kHz and 0.1 Hz are equal to 20 Ω and 900 Ω respectively.

The mean capacity of the element, restored on discharge, is 5.4 mA h, which corresponds to a capacity per unit mass of the positive electrode containing the dopant of 74 A h/kg of electrode.

We claim:

1. A composition comprising an electrically conductive polymer selected from the group consisting of polypyrrole, substituted polypyrrole and a mixture thereof, said composition comprising an ionic compound which contains a 2-ethylhexylsulphate group.

2. A composition according to claim 1, wherein the composition has a pore volume greater than 1 cm(3) g(−1).

3. A composition according to claim 1, comprising a substituted polypyrrole derived from a substituted pyrrole in which the 3 or 3 or 4 positions are substituted, or from N-methylpyrrole.

4. A composition according to claim 1, comprising unsubstituted polypyrrole.

5. A composition according to claim 1, comprising between 0.01 to 0.9 parts of the ionic compound per part of pyrrole units present in the polypyrrole, substituted polypyrrole or a mixture thereof.

6. A composition according to claim 1, comprising between 0.05 and 0.5 parts of the ionic compound per part of pyrrole units present in the polypyrrole, substituted polypyrrole or a mixture thereof.

7. A composition according to claim 1, comprising between 0.05 and 0.4 parts of the ionic compound per part of pyrrole units present in the polypyrrole, substituted polypyrrole or a mixture thereof.

8. A composition according to claim 1, further comprising a chloride group.

9. A composition according to claim 1, further comprising an additional ionic compound which contains a chloride group, a sulphate group, or a nitrate group.

10. A composition according to claim 1, further comprising an additional ionic compound which contains a trichloroacetate group, a phenylphosphonate group, a 2-glycerolphosphate group, a pentadecylsulphonate group, a hexadecylsulphonate group, a polyvinylsulphonate group, a polystyrenesulphonate group, a dodecylbenzenesulphonate group, a tosylate group, a trifluoromethanesulphonate group, or a dodecylsulphate group.

11. A composition according to claim 4 which has pore volume of between 1.5 and 5 $cm^3 g^{-1}$.

12. A composition according to claim 4 which has pore volume greater than 3.5 $cm^3 g^{-1}$.

* * * * *